UNITED STATES PATENT OFFICE.

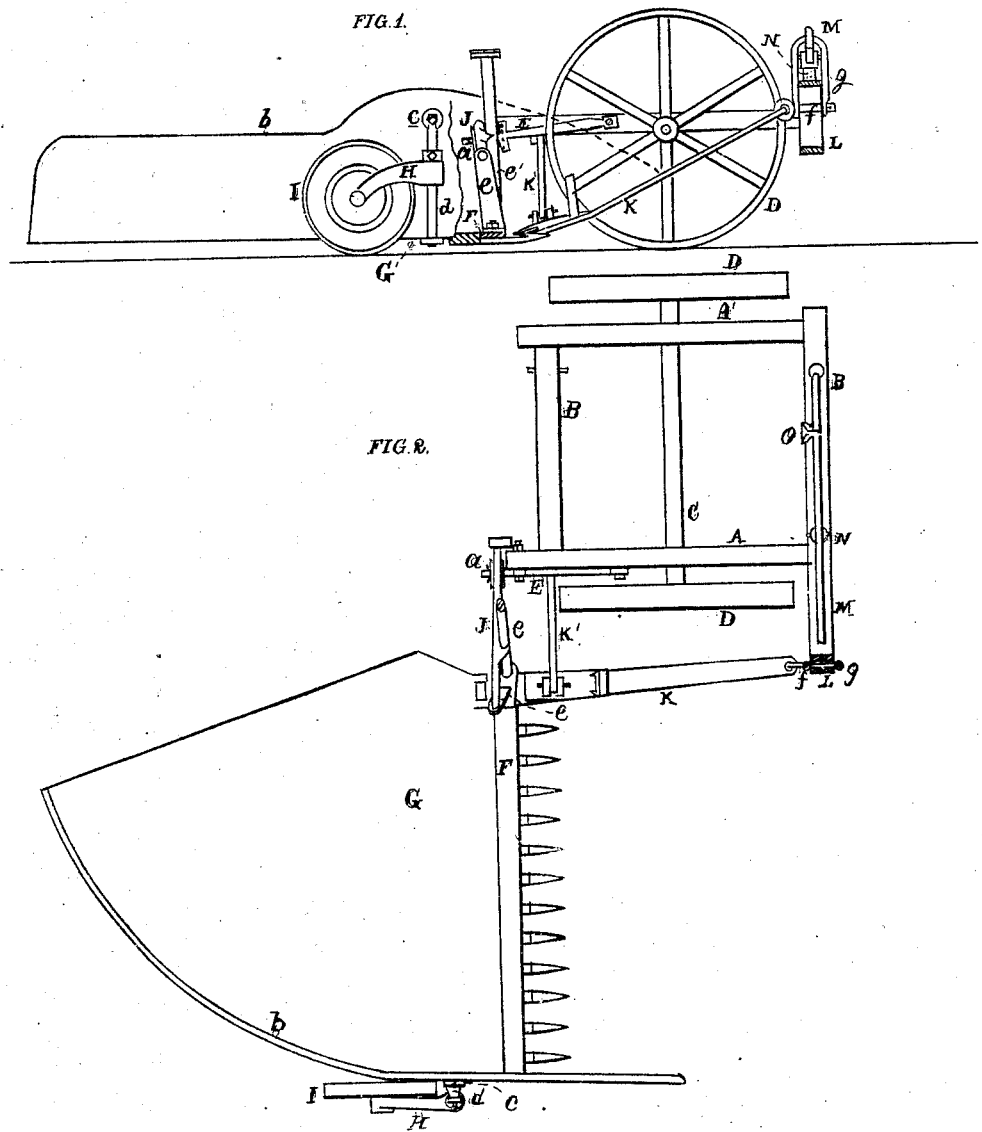

DAVID R. PAISTE, OF WILLISTOWN, PENNSYLVANIA, ASSIGNOR TO REESE, LAKE, MELICK & CO.

IMPROVEMENT IN HARVESTERS.

Specification forming part of Letters Patent No. 55,427, dated June 5, 1866.

*To all whom it may concern:*

Be it known that I, D. R. PAISTE, of Willistown, Chester county, Pennsylvania, have invented an Improvement in Harvesting-Machines; and I do hereby declare the following to be a full, clear, and exact description of the same, reference being had to the accompanying drawings, and to the letters of reference marked thereon.

My invention consists of certain devices, fully described hereinafter, whereby the finger-bar of a harvester may be firmly secured to the frame of the machine and yet may readily adjust itself to any required angle to the frame when the surface of the ground is so irregular as to render such adjustment necessary.

In order to enable others skilled in the art to make and use my invention, I will now proceed to describe its construction and operation.

On reference to the accompanying drawing, which forms a part of this specification, Figure 1 is a side elevation of a harvester with my improvement, and Fig. 2 a plan view.

A and A' are the side beams, and B and B' are the end beams, of a frame which rests on an axle, C, and to the ends of the latter are secured the wheels D D.

To the outer side of the beam A is hung an adjustable lever, E, and on the end of the latter which projects beyond the beam turns a grooved pulley, a.

To the finger-bar F is connected the usual platform G, and to a flange, b, at the side of the latter are secured brackets c c, between which extends a rod, d.

On a pin projecting from an arm, H, which is adjustable on the rod d, turns a pulley, I, the latter bearing on the ground and maintaining the outer edge of the platform G free from contact with the same.

From braces e e', near the inner end of the finger-bar, extends a horizontal rod, J, which rests in the grooved pulley a, and to the inner end of the cutter-bar is also secured one end of the draw-bar K, to which is connected one end of a brace, K', the latter being secured at its opposite end to the beam B'.

The outer end of the draw-bar is connected to a staple, f, which passes through a slotted plate, L, on the end of the beam B, and which is hung to a link, g, suspended from the end of a lever, M, the latter vibrating on a pin in the upper end of an upright, N, secured to the cross-beam B, to which is also attached an upright, O, and in the latter are a series of notches adapted for the reception of the lever M.

In harvesters of the ordinary construction the finger-bar is connected to the frame of the machine, either by double hinges or by one or two braces similar to the brace K', the latter being weak and liable to be broken or injured when there is any considerable resistance to the forward motion of the bar.

In the above-described machine the finger-bar is suspended between the pulley I and the rod J, so that the brace K cannot be strained or otherwise injured by any resistance to the forward motion of the bar, while the latter can readily adjust itself to any required angle to the frame when the surface of the ground is irregular, the expensive and heavy hinges usually employed for this purpose being thus dispensed with.

It will be seen, also, that by adjusting the lever E the inner end of the finger-bar can be secured at any desired distance above the surface of the ground. If desirable, however, the pulley a may turn on a fixed pin projecting from the frame of the machine.

I claim as my invention and desire to secure by Letters Patent—

1. The finger-bar F, with its bar J, in combination with the brace K' and the grooved pulley a, secured to the frame of the machine, the whole being arranged and operating substantially as and for the purpose described.

2. The combination, with the above, of the adjustable lever E, substantially as and for the purpose herein set forth.

In testimony whereof I have signed my name to this specification in the presence of two subscribing witnesses.

DAVID R. PAISTE.

Witnesses:
CHARLES E. FOSTER,
JOHN WHITE.